Oct. 25, 1955     W. H. CRISWELL     2,721,591
GEARED SCREW DRIVER
Filed Feb. 17, 1953     2 Sheets—Sheet 1
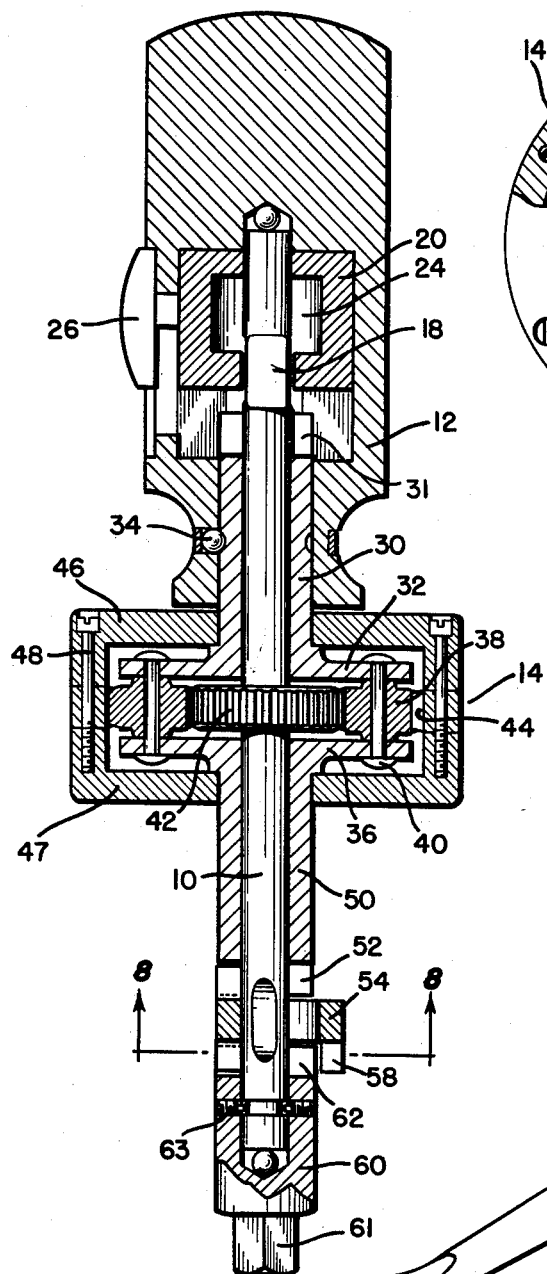
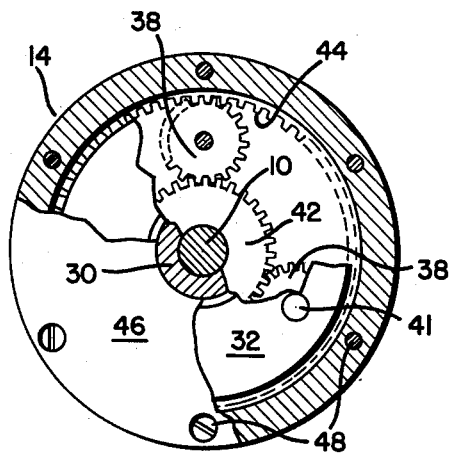
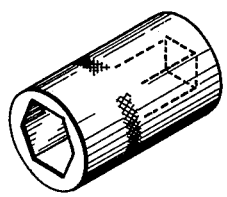
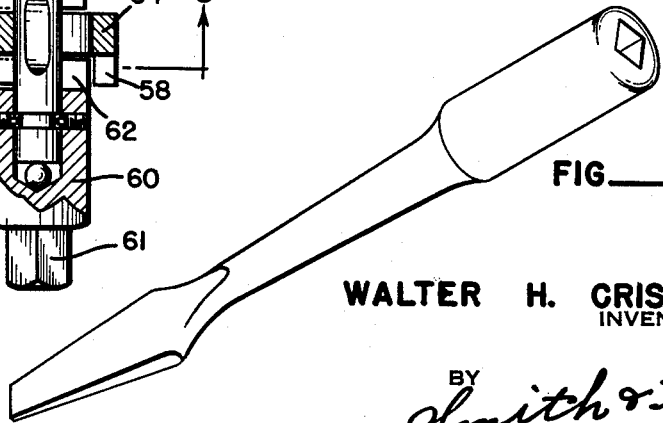
WALTER H. CRISWELL
INVENTOR
BY Smith & Tuck Oct. 25, 1955 W. H. CRISWELL 2,721,591
GEARED SCREW DRIVER
Filed Feb. 17, 1953 2 Sheets-Sheet 2
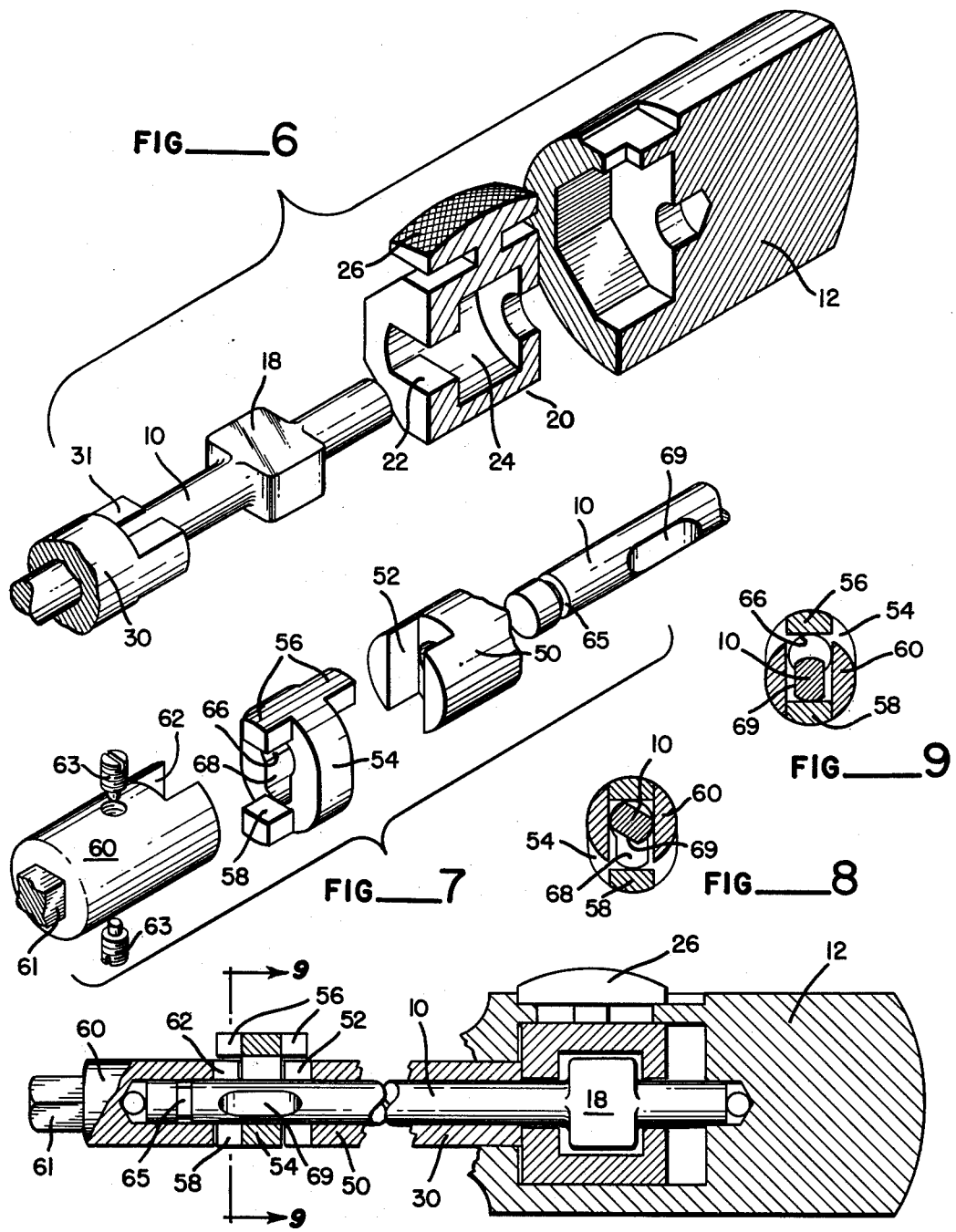
WALTER H. CRISWELL
INVENTOR
BY Smith & Tuck

United States Patent Office 2,721,591
Patented Oct. 25, 1955

2,721,591

GEARED SCREW DRIVER

Walter H. Criswell, Edmonds, Wash.

Application February 17, 1953, Serial No. 337,388

5 Claims. (Cl. 145—66)

This present invention relates to the general art of screw drivers or screw driver wrenches and, more particularly, to a geared type of screw driver or wrench. In this present screw driver, use of gearing and clutches permits the selective arrangement wherein the screw driver can be driven at a lesser speed than the handle is turned; or the mechanism can be locked so that the screw driver bit will turn with the handle; or, as a third alternative, the screw driver bit can be driven at a considerable increase in speed over the speed of turning the handle. This versatility of operation is obtained by employing a planetary type of gearing using a sun gear, planet gears, and an enclosing internal gear. An arrangement of clutching permits the selective driving of either the sun gear or the carrier or the planet gears. This in association with the ability to hold the internal gear against rotation gives the overdrive or underdrive. This clutching arrangement also makes it possible to lock the mechanism so that the bit end turns at the same speed as the handle.

There are many occasions when using the manual type or the power-driven type of screw drivers that it is desirable to have different speeds available. There are many building operations where it is necessary to drive a large number of screws, also, in metal fabrication, where it is desirable to tighten nuts on small bolts. Usually the screw or nut starts quite freely, yet in most cases it is very difficult to turn the screw directly by hand, aside from the danger of cutting oneself. Under such conditions, it is very desirable that the screw driver turn the screw or nut at a relatively high speed so as to quickly get it down to a bearing where it begins to engage fully. Under such conditions, to be able to revolve the bit or wrench faster than the handle is turned, is of real time saving importance. When the screw is nearing bottom, or the bolt has made contact, it is then desirable to apply much greater torque and under such conditions it is very helpful to be able to change the speed so that the bit turns more slowly than the handle and thus gives the operator much greater mechanical advantage. Both of these conditions are fully met in this present geared screw driver together with the ability to have the bit end of the tool driven at the same speed as the handle is turned.

The principal object of this present invention is to provide a geared screw driver which will drive the bit at normal speed, or in either overdrive or underdrive as desired.

A further object of this invention is to provide in a compact, unitary structure a geared screw driver that will greatly facilitate the driving or loosening of screws or nuts.

Further objects, advantages and capabilities will be apparent from the description and disclosure in the drawings, or may be comprehended or are inherent in the device.

In the drawings:

Figure 1 is a longitudinal sectional view through a screw driver made after the teachings of this present invention, certain parts being somewhat exaggerated in proportion for clarity of illustration;

Figure 2 is a cross sectional view along the line 2—2 of Figure 1;

Figures 3 and 4 are illustrative forms of screw drivers and sockets suitable for use with this tool;

Figure 5 is a longitudinal sectional view through my screw driver, the same being broken away and omitting the gearing assembly and showing the screw driver in its high speed or overdrive position;

Figure 6 is an exploded but bracketed view, partly in section, illustrating certain parts of the mechanism of this screw driver;

Figure 7 is a similar exploded perspective view showing in general a continuation of the parts of Figure 6;

Figure 8 is a cross sectional view along the line 8—8 of Figure 1; and

Figure 9 is a cross sectional view taken along the line 9—9 of Figure 5.

Referring more particularly to the disclosure in the drawings, the numeral 10 is the axially disposed drive shaft of the screw driver. It extends from the handle portion 12 through the gear assembly 14 to the driving head 60. It is provided with a ball thrust bearing at each end. Within handle 12 shaft 10 is deformed as at 18 so that the same may be selectively engaged by the lock block 20. Lock block 20 has a transverse slot 22 or other configurations adapted to engage the deformed portion 18 of shaft 10. When, however, the lock block is moved downwardly as illustrated in Figure 1, a chamber 24 is provided sufficiently large so that the deformed portion of the shaft may revolve freely therein. This arrangement forms a clutch by which handle 12 may be engaged and disengaged from shaft 10. Handle 12 is suitably relieved so as to permit the longitudinal movement of the lock block 22 and the shift strut 26, while preventing any rotation relative to handle 12.

Handle 12 is positioned by and revolvable upon the driving hub 30 of the driving flange plate 32. Hub 30 is provided with the end lugs 31 adapted to selectively co-act with slot 22. The longitudinal movement of handle 12 in respect to hub 30 is prevented by grooving the hub around its periphery so that a locking ball 34 is seated therein and maintains the lock while rotating around the periphery. Flange plate 32 and its companion driven flange plate 36 provide the support and positioning means for a plurality of intermediate pinions or planet gears 38 which are revolvably disposed on the through pinion pins or rivets 40. Secured to shaft 10 is the central pinion or sun gear 42 adapted to engage the planet gears in driving relationship. Surrounding the planet gears is an internal ring gear 44. This gear must be properly proportioned to operatively engage the planet gears. Ring gear 44 is secured between two half gear housing members 46 and 47 which are suitably joined together as by a plurality of fillister screws 48.

Flange plate 36 is provided with the driven hub portion 50, similar to hub portion 30 of flange plate 32. Both of these hubs encircle shaft 10 which is free to turn therein. The extreme end of hub 50 is slotted as at 52 to provide one portion of a dental clutch or jaw clutch. There is provided a drive head clutch 54 which is in constant engagement with the drive head 60 while selectively engaging either the shaft 10 or hub 50, as will be more fully described. Because of thrust considerations, such as when the operator presses on handle 12 or gear housing 14, clutch 54 does not slide on shaft 10 but is able to be moved transversely of the same. The operation will be understood it is believed from a study of the Figures 7, 8, and 9 in which it will be noted that shaft 10 is milled away at 69 to provide the cross sections of shaft 10 shown in Figures 8 and 9. Clutch 54 is provided with a keyhole shaped opening, having a cylindrical portion 66 which is adapted to receive shaft 10 in revolvable relationship, and a portion of reduced width 68 adapted to receive the milled section 69 of shaft 10. Clutch 54 is also provided with teeth 56, one of which is capable of engaging slot 52 in the end of hub portion 50 while the other engages slot 62 in the end of drive head 60. A single tooth 58 is provided on the opposite side of clutch 54 also adapted to engage slot 62.

As shown in Figures 1 and 8, shaft 10 is free to rotate within clutch 54 while the teeth 56 engage both the hub 50 and drive head 60. The alternate position is shown in Figures 5 and 9 wherein the shaft 10 is engaged by the reduced width portion 68 of the keyhole opening in clutch 54 while tooth 58 is in engagement with head 60. The drive head 60 may be formed in any of the variety of manners in which detachable tools are fashioned. In Figures 3 and 4 are shown tools adapted to engage the squared portion 61 of the drive head. The drive head 60 is secured to shaft 10 as against longitudinal movement thereon by detent set screws 63 which detents seat in groove 65 which extends around shaft 10.

*Method of operation*

The most common situation confronting the user of a screw driver is one in which the resistance to the driving torque becomes greater as the screw is driven deeper. Assuming that to be the case the user of this screw driver would start with the locking block 20 and the clutch 54 in the position shown in Figure 5. Gripping the gear housing with one hand, the user revolves the handle 12 with the other. This rotary movement is transmitted to the locking block 20 which in turn rotates the shaft hub 30 since the end portion 31 is being held by the slot 22 in locking block 20. With the clutch member 54 in its uppermost position as viewed in Figures 5 and 9, the opposite end of shaft hub 50 is able to rotate free of the clutch 54 and the drive head 60.

Through the flange plates 32 and 36, between which the intermediate pinions are rotatably mounted, they are rotated about the axis of the shaft 10. Since these intermediate pinions or planet gears are in mesh with the internal ring gear 44, they are caused to go into counter rotation about their own axis as they rotate about the axis of shaft 10. These rotary impulses are transmitted to the central pinion 42, which is in mesh with the intermediate pinions 38, thereby causing them to rotate at a multiplied speed. With both the central pinion 42 and the main shaft 10, to which it is fixed, rotating, the drive head 60 is rotated by the clutch member 54 which engages the flattened portion 69 of the main shaft 10 while tooth 58 engages the slot 62 in the drive head 60. Thus as the handle is turned and the gear housing is held motionless, the drive head is rotated at an increased or overdrive speed.

As the screw driving becomes increasingly difficult, the user may change either the locking block 20, or the clutch 54, to obtain a direct drive and thereby procure less speed and more power from his efforts. By shifting the locking block 20 to the position of Figure 1, the handle rotates the shaft which is in turn fixed through the clutch 54 to the drive head 60. This direct drive may also be achieved through changing the clutch 54 to the position of Figure 1 while leaving the locking block 20 in the position of Figure 5. Thereby the rotation of the flange plate hub 30 by the handle 12 is transmitted directly to the clutch and thereby to the drive head 60. In either of these positions, gear housing 14 may be held motionless while the handle is turned, since shaft 10 is never locked to housing members 30 and 50.

When maximum torque is required, both the locking block 20 and the clutch 54 must be in the position of Figure 1. Now as the handle rotates, the locking block 20 is in engagement with the flat bar portion 18 of the main shaft 10. The shaft 10 is rotated at a speed the same as the handle. As shown in Figure 8, the clutch has disengaged the shaft 10 which is now free to rotate within the clutch. With the central pinion or sun gear 42 rotating with the main shaft 10 and the gear housing 14 being held against rotation, the intermediate pinions 38 are caused to rotate about their axes which in turn cause the flange plates 32 and 36, upon which they rotate, to revolve about their axes. Since the flange plate is formed as part of the flange hub, this hub 50 is similarly rotated, which is at a reduced speed from the rotation of the handle and the shaft. The clutch is now in a position to transmit the rotation of the hub 50 to the drive head and thus, while a reduced speed is obtained, the power is multiplied and a greater torque is achieved.

It is believed it will be clearly apparent from the above description and the disclosure in the drawings that the invention comprehends a novel construction of a geared screw driver.

Having thus disclosed the invention, I claim:

1. A geared screw driver, comprising: a drive shaft and a handle rotatably mounted on one end of said drive shaft and a driven socket member, adapted to receive a detachable tool, rotatably mounted on the other end of said drive shaft; a sun gear secured to said drive shaft in its intermediate portion and a pair of tubular members positioned on said shaft on either side of said sun gear having opposed flanges at their adjacent ends, a planet gear rotatably supported by said flanges and meshed with said sun gear, an internal ring gear meshed with said planet gear; said shaft having an enlarged, deformed portion and a locking block slidable longitudinally of said handle along said shaft having a slot extending transversely of said shaft and engaging said deformed portion of said shaft in one position so that said handle and said shaft rotate together, the tubular member adjacent said handle having end lugs engaging said slot in another position of said locking block so that said handle and the adjacent tubular member rotate together; said shaft having a flattened portion between said driven member and the adjacent tubular member, a clutch member having a keyhole shaped opening in which said flattened portion of said shaft is positioned, said clutch member being slidable laterally of said shaft from a first position in which the narrow end of said keyhole shaped opening is engaged with said flattened portion of said shaft preventing relative movement therebetween to a second position in which the broad end of said keyhole shaped opening is aligned with said shaft permitting relative movement therebetween, said clutch member having tooth means engaging and locking the adjacent tubular member and the driven member in said second position and said clutch member having tooth means engaging and locking only the driven member in said first position.

2. A geared screw driver, comprising: a drive shaft and a handle rotatably mounted on one end of said drive shaft and a driven member rotatably mounted on the other end of said drive shaft; a sun gear secured to said drive shaft in its intermediate portion and a pair of tubular members positioned on said shaft on either side of said sun gear having opposed flanges at their adjacent ends, a planet gear rotatably supported by said flanges and meshed with said sun gear, an annular casing enclosing said flanges and gears having an internal ring gear meshed with said planet gear; means for locking said handle alternatively to said shaft or to the adjacent tubular members, said shaft having a flattened portion between said driven member and the adjacent tubular member, a clutch member having a keyhole shaped opening in which said flattened portion of said shaft is positioned, said clutch member being slidable laterally of said shaft from a first position in which the narrow end of said keyhole shaped opening is engaged with said flattened portion of said shaft preventing relative movement therebetween to a second position in which the broad end of said keyhole shaped opening is aligned with said shaft permitting relative movement therebetween, said clutch member having tooth means engaging and locking the adjacent tubular member and the driven member in said second position and said clutch member having tooth means engaging and locking only the driven member in said first position.

3. A geared screw driver, comprising: a solid drive shaft and a handle rotatably mounted on one end of said drive shaft and a driven member rotatably mounted on the other end of said drive shaft; a sun gear fixedly secured to said drive shaft in its intermediate portion and a pair of tubular members positioned on said shaft on either side of said sun gear having opposed flanges at their adjacent ends, a planet gear rotatably supported by said flanges and meshed with said sun gear, an annular casing enclosing said flanges and gears having an internal ring gear meshed with said planet gear; means manually operable to lock said driven member alternatively to said shaft or to the adjacent tubular member; and said shaft having an enlarged, deformed portion and a locking block slidable longitudinally of said handle along said shaft having a slot extending transversely of said shaft and engaging said deformed portion of said shaft in a first position so that said handle and said shaft rotate together, the tubular member adjacent said handle having end lugs engaging said slot in a second position of said locking block so that said handle and the adjacent tubular member rotate together.

4. A geared screw driver, comprising: a solid drive shaft and a handle rotatably mounted on one end of said drive shaft and a driven member rotatably mounted on the other end of said drive shaft; a sun gear fixedly secured to said drive shaft in its intermediate portion and a pair of tubular members positioned on said shaft on either side of said sun gear having opposed flanges at their adjacent ends, a planet gear rotatably supported by said flanges and meshed with said sun gear, an annular casing enclosing said flanges and gears having an internal ring gear meshed with said planet gear; means manually operable to lock said handle alternatively to said shaft or to the adjacent tubular member; and means manually operable to lock said driven member alternatively to said shaft or to the adjacent tubular member.

5. Means connecting a drive member to a driven member, comprising: a drive shaft and a first and a second end member rotatably mounted on the ends of said drive shaft, one of said end members forming a drive member and the other of said end members forming a driven member; a sun gear secured to said drive shaft in its intermediate portion and a pair of tubular members positioned on said shaft on either side of said sun gear having opposed flanges at their adjacent ends, a planet gear rotatably supported by said flanges and meshed with said sun gear, an internal ring gear meshed with said planet gear; said shaft having an enlarged, deformed portion and a locking block slidable longitudinally of said first end member along said shaft having a slot extending transversely of said shaft and engaging said deformed portion of said shaft in one position so that said first end member and said shaft rotate together, the tubular member adjacent said first end member having end lugs engaging said slot in another position of said locking block so that said first end member and the adjacent tubular member rotate together; said shaft having a flattened portion between said second end member and the adjacent tubular member, a clutch member having a keyhole shaped opening in which said flattened portion of said shaft is positioned, said clutch member being slidable laterally of said shaft from a first position in which the narrow end of said keyhole shaped opening is engaged with said flattened portion of said shaft preventing relative movement therebetween to a second position in which the broad end of said keyhole shaped opening is aligned with said shaft permitting relative movement therebetween, said clutch member having tooth means engaging and locking the adjacent tubular member and said second end member in said second position and said clutch member having tooth means engaging and locking only the second end member in said first position.

References Cited in the file of this patent

UNITED STATES PATENTS

| | | |
|---|---|---|
| 311,255 | Pedersen | Jan. 27, 1885 |
| 823,658 | Wilson et al. | June 19, 1906 |
| 919,156 | Gilmore | Apr. 20, 1909 |
| 1,342,195 | Walker | June 1, 1920 |
| 1,493,160 | Pierce | May 6, 1924 |
| 1,626,719 | Callison | May 3, 1927 |
| 1,991,766 | Matveyelf | Feb. 19, 1935 |
| 2,092,598 | Blair | Sept. 7, 1937 |
| 2,464,890 | Premo | Mar. 22, 1949 |